Patented Oct. 1, 1946

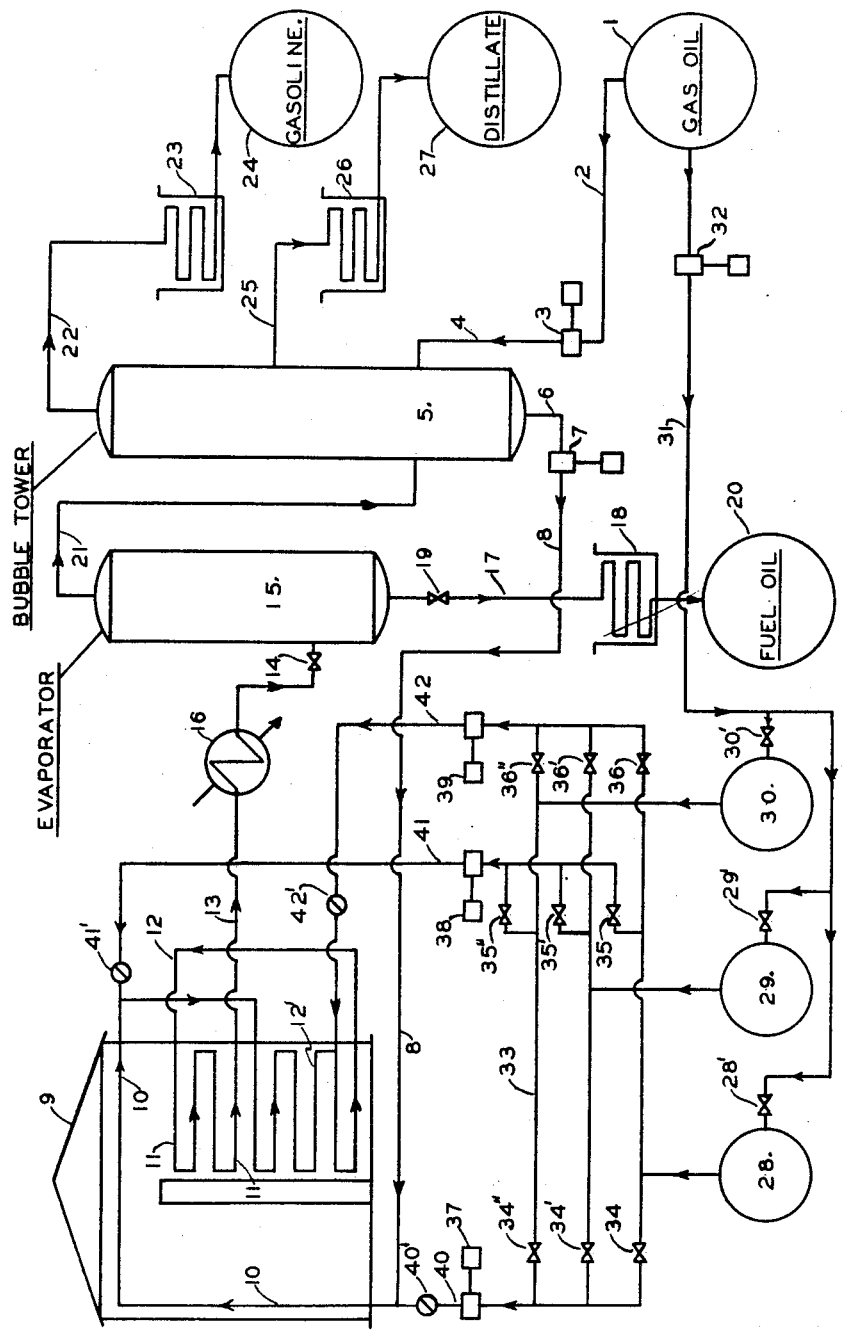

2,408,584

UNITED STATES PATENT OFFICE 2,408,584

HYDROCARBON CRACKING PROCESS WITH SUCCESSIVE ADDITIONS OF ADSORBENT

Arthur D. Smith, Park Ridge, Ill., assignor to Jenkins Petroleum Process Company, Chicago, Ill.

Application February 10, 1945, Serial No. 577,217
In Canada September 27, 1944

6 Claims. (Cl. 196—55)

The invention relates to an improvement in process for treating hydrocarbons in the presence of certain finely divided adsorbents and particularly to a process for contacting petroleum hydrocarbons, lying outside of the boiling range of gasoline and while obtaining under transforming conditions of heat and pressure, with intimately dispersed finely divided hydrous mineral adsorbent possessing a structural water content substantially vaporizable under the transforming conditions employed.

A known process comprises among other features continuously subjecting a petroleum oil, in which is suspended a finely divided mineral adsorbent towards carbon and carbon-forming substance, to cracking conditions of heat and pressure, whereby carbon and carbon-forming substance produced during the reaction is associated with the adsorbent and prevented thereby from depositing on the walls of the cracking apparatus employed. Among suitable adsorbents recited in such process, is the hydrous mineral adsorbent calcium hydroxide; such being particularly an adsorbent towards sulphur-bearing asphaltenes, the ultimate degradation products of which are carbon and hydrogen sulphide. The latter is neutralized by the hydroxide and the contaminating corrosive effect of the hydrogen sulphide on the metal of the apparatus substantially reduced. It has been more recently discovered that the efficiency of such decontaminating action is increased by release of structural water from the calcium hydroxide during the reaction, such release producing fissures and pores in the hydroxide particles; or in short, forming additional effective contact surface favorable to hydrogen sulphide retention. While the general phenomenon of structural water release is inherent in the above described process, the actual percentage evolved, and the stages in which evolution occurs, will vary with the cracking conditions imposed and the purity of the calcium hydroxide employed; all militating against the continuous nascent release of structural water during the entire or substantially the entire cracking phase, and thus against the optimum in efficiency of adsorptive effect.

The present invention is an improvement over the foregoing in that it provides not only for the continuous or substantially continuous release of structural water from a hydrous adsorbent dispersed in fluid hydrocarbon subjected to transforming conditions of heat and pressure, but for such release during the entire or substantially the entire period such hydrocarbon is subjected to such transforming conditions.

An important object of the invention is to provide, through such immediately above described release of structural water, a corresponding continuous fresh contact surface in the thus produced dehydrated or partially dehydrated adsorbent, partly through the formation of smaller particles of adsorbent due to the disintegrative effect of the escaping water vapor, and partly through the formation of microscopic pores and fissures in the original particles.

A corollary object of the invention is to provide, through such immediately above described formation of fresh contact surface, a corresponding continuous augmented nascent adsorptive and/or catalytic effect; the advantage of such improvement being readily apparent where the dehydrated or substantially dehydrated adsorbent, for example bentonite, acts catalytically in improving the yield and/or quality of desired light hydrocarbons.

Another object of the invention where, for example, the highly basic calcium hydroxide is employed as the hydrous adsorbent, is to provide, through the above described increased active contact surface in the adsorbent particles, for intensified formation of calcium sulphide from hydrogen sulphide commonly obtaining in petroleum transforming operations; the continuous nascent liberation of structural water increasing the activity of the reaction.

Another object of the invention ancillary to the immediately preceding is to reduce, through such above described intensified formation of calcium sulphide, the contaminating corrosive effect of hydrogen sulphide on the metal of the transforming apparatus.

Of the several hydrous adsorbents that may be employed to develop the optimum in fresh active surface contact through release of structural water, may be mentioned bentonite, bauxite and the hydroxides of the alkaline earth metals, but I prefer to employ bentonite where catalytic action is a paramount issue, calcium hydroxide where intensified chemical action towards hydrogen sulphide is wanted, and a mixture of the two where both effects are desired.

In order that the invention may be more readily understood, reference is made to the accompanying drawing of a flow diagram embodying a concrete example of one of the many operative conditions to which the invention may be applied.

Referring to such drawing, let it be assumed a petroleum hydrocarbon, for example, gas oil, as supplied from the tank 1 through the line 2, is charged by the pump 3, through the line 4, to the bubble tower 5, and that a composite virgin gas and recycle oil therefrom, obtaining at 710° F. (an incipient cracking temperature) and flowing through the line 6 to the hot oil pump 7, is introduced by such pump through the line 8 to the transforming furnace 9.

Let it be further assumed that the oil, obtaining under 400 lbs. pressure, enters the radiant coil 10 disposed in the furnace 9, requires three minutes for passage through such coil and discharges therefrom at 910° F., that the effluent from coil 10 enters the convection coil 11, requires five minutes for passage and discharges therefrom at 1060° F., that the oil stream respectively obtains at 950° F. and 1000° F. at return bends 12 and 12', that the time factor between 910° F., and 950° F. is two minutes, between 950° F. and 1000° F. one and one-half minutes, and that the final effluent from said convection coil is released under reduced pressure through the line 13, as controlled by the pressure release valve 14, to the evaporator 15 (after first having its temperature lowered in the heat exchange means 16) to incipient transforming conditions; it being noted that the oil is thus subjected for a total period of eight minutes to transforming conditions of heat and pressure embracing a range of 710° F.–1060° F. Heavy residual oil containing spent adsorbent, whose introduction to the system will be subsequently discussed, is withdrawn from the bottom of the evaporator through the line 17 and cooler 18, as controlled by valve 19, to the fuel oil tank 20; while light fractions separated in the evaporator pass through the line 21 to the bubble tower 5 in which gasoline and distillate vapor are separated from recycle oil; gasoline passing through the line 22 and condenser 23 to the tank 24, distillate through line 25 and condenser 26 to the tank 27, and the recycle oil admixed with the virgin gas oil introduced through the bubble tower, forming the composite charging stock to the transforming coil in the manner as above described.

While any one, or a mixture of two or more of the previously mentioned hydrous adsorbents, depending on the adsorptive and/or catalytic effect desired, may be employed under the above described operative conditions, let it be further assumed a technical grade of calcium hydroxide of high purity is actually used in the above case, in quantity 0.6 lb. of hydroxide per bbl. of oil charged to the coil; the specific problem being to so introduce such quantity of hydroxide as to ensure a continuous nascent release of structural water therefrom over the entire or substantially the entire transforming range of 710° F.–1060° F.; or otherwise expressed, to ensure the optimum in fresh active contact surface of adsorbent over such period.

To achieve such effect, I first subject a carefully weighed sample representative of the adsorbent to be employed, say 5 grms., to a preliminary dehydration test in a current of dry hydrocarbon gas such as methane; the test sample preferably obtaining as a thin layer in a platinum boat disposed in a chrome alloy tube heated by an electric furnace, with the heating tube connecting to a water cooled condenser fitted with a graduated receiver. The above test is further conducted under the pressure, temperature and time factor of the transforming relations to be imposed on the hydrocarbon in which the adsorbent is to be employed; the percentages of structural water released from the test sample per temperature rise being carefully recorded.

The results of such a test applied to a technical grade of calcium hydroxide of high purity under the transforming conditions previously described in the concrete example follow:

| Time interval, minutes | Temperature differential, °F. | Percent structural water released | Percent of total (24.3%) structural water released |
| --- | --- | --- | --- |
| 1 | [1] 710– 800 | 1.79 | 7.37 |
| 1 | [1] 800– 850 | 6.17 | 25.39 |
| 1 | [1] 850– 910 | 7.17 | 29.50 |
| 2 | [2] 910– 950 | 0.47 | 1.93 |
| 1½ | [2] 950–1000 | 0.00 | 0.00 |
| 1½ | [2] 1000–1060 | 0.00 | 0.00 |
| 8 | 710–1060 | 15.60 | 64.19 |

[1] Radiant section period.
[2] Convection section period.

From the above it will be noted that under the time factor involved, release of structural water from the hydroxide in question practically ceases between 910° and 950° F. A second dehydration test is therefore conducted on a fresh sample of the hydroxide, the chrome alloy tube being previously preheated to 910° F. before inserting the sample, and the time factor between 910° and 1060° F. maintained at five minutes. Such test, due to the higher initial temperature involved, will generally result in substantially the same total quantity of water being expelled as in the first preliminary test; occasionally between the range of 910° and 1060° F., but more often between 910° and 1000° F., thus requiring a third addition of hydroxide to bridge the final gap of aqueous evolution between 1000° and 1060° F.

Therefore, to comply with the invention and ensure a continuous release of structural water from the 0.6 lb. of hydroxide over the entire or substantially the entire 710°–1060° F. range, it will be necessary in the first case to continuously introduce the hydroxide in two portions, one, when the oil stream obtains at 710° F., the other between 910° F. and 950° F.; in the second case, in three portions, with the oil stream obtaining at 710° F., between 910° F. and 950° F., and at 1000° F. respectively. To further ensure the optimum in adsorptive and/or catalytic effect, the said portions of adsorbent should generally lie in the same ratio to the total quantity introduced, as the corresponding time factor per temperature interval of injection is to the total time factor of the transforming conditions employed.

Introduction of adsorbent to the system may be effected in dry form dispersed in a hydrocarbon vapor carrier such as heavy naphtha vapor; or as a slurry suspended in a carrier oil conveniently of the same grade as to be transformed.

Referring again to the accompanying drawing: 28, 29 and 30 represent a plurality of any number of slurry tanks as may be desired, such tanks being fitted with mechanical agitating means (not shown) and supplied with carrier oil through the line 31, by pump 32, from tank 1; valves 28', 29' and 30' serving to control the flow of such oil to said tanks. The latter are connected through the grid manifold 33, as controlled by valves 34, 34', 34'', 35, 35', 35'', 36, 36', 36'', to the separately operated high pressure pumps 37, 38 and 39; such arrangement permitting feed from any one or all of said tanks to any one or all of said pumps. The latter are further fitted with individual automatic controls of a well-known type (not shown) which can be set so that the pumps will continuously deliver predetermined volumes of slurry to the transforming coil through lines 40, 41 and 42, respectively equipped with check valves 40', 41' and 42'; such injection lines being depicted in the accompanying drawing as connecting to said coil at the predetermined points described in the concrete example. In such example, the slurry may be batch prepared in tanks 28 and 29 and withdrawn from one tank while the other is being refilled; or it may be pumped entirely from one tank, i. e., tank 28, which is continuously supplied with carrier oil and calcium hydroxide in the proper proportions. Further assuming such slurry to be of a concentration, say of 0.75 lb. of hydroxide per gallon of carrier oil and to obtain in tank 28, it may be respectively introduced therefrom by pumps 37 and 38 to the radiant and convection sections of said coil at the herein described predetermined temperatures, after closing valves 34', 34'', 35', 35'', 36, 36', 36'' and opening valves 34 and 35. The said pumps 37 and 38 may be set to continuously deliver their respective slurry increments in the same quantitative ratio as the time factors given in the concrete example; i. e., so that 0.225 lb. and 0.375 lb. of calcium hydroxide (total 0.6 lb.) per barrel of oil charged to the coil, will respectively enter said radiant and convection sections. By opening valve 36 and thus permitting pump 39 to function, increments of 0.225 lb., 0.200 lb., and 0.175 lb. of hydroxide (total 0.6 lb.) may be respectively injected under the time factors and at the coil section points described herein; although it is to be understood that increments of adsorbent introduced may be in disproportionate relationship to the time factors involved.

It is to be further understood the percentages of structural water released for a given temperature in the above described preliminary dehydration tests are illustrative only, since another calcium hydroxide of practically the same technical purity and tested under identical conditions, but destone, or calcined and/or slaked at a different rived, for example, from a finer grained lime-temperature, or rate, may show figures at variance from those given; therefore the necessity for separate preliminary dehydration tests on calcium hydroxides from different sources to determine their proper injection points. In any case, however, no unit lot of calcium hydroxide has been found, that when continuously introduced, will release structural water over the entire or substantially the entire transforming conditions herein disclosed; hence the need of multiple introductions of such hydroxide to attain the optimum in fresh active surface contact and the ensuing benefits thereby.

As a simpler alternative to multiple introduction of a single grade of calcium hydroxide, one continuous injection may be employed of a mixture in suitable proportions, as determined by preliminary dehydration tests of the order herein described, of calcium hydroxide of the technical purity discussed and a calcium hydroxide containing over 1%, and preferably between 3 and 8%, of calcium carbonate, that will release structural water over substantially the entire transforming range herein disclosed. Such phenomenon is due to the fact that the presence of a relatively small quantity of carbonate, or carbonic acid derived therefrom and released during the reaction in the high temperature brackets, so retards the evolution of structural water from the carbonate-containing component of the mixture, that under the time factor involved, such aqueous evolution occurs in the said higher temperature brackets, thus closing the gap required to be filled by multiple introduction where a single grade of hydroxide is employed.

In like manner to the specific example given for calcium hydroxide, preliminary dehydration tests may be applied to any of the hydrous adsorbents mentioned herein, or to those of similar class, and from the structural water release data thus obtained the number of multiple introductions and points of injection necessary to effect a substantially continuous aqueous release over an entire predetermined transforming range can be readily determined. It will also be apparent to those skilled in the art that increments of two or more different adsorbents of the class described, such as for example, bentonite and calcium hydroxide, may be introduced pre-mixed at one or more predetermined points of the transforming coil, or separately injected at a plurality of points; the specific point or points of injection depending on preliminary dehydration data and the specific objective to be obtained, within the thesis of effecting a continuous or substantially continuous release of structural water from the adsorbent introduced over the particular transforming conditions involved.

The invention is further not limited to the apparatus, pressures, temperatures, time factors, quantities and ratios disclosed herein which are to be considered as illustrative only of one set of conditions comprehended by the invention, and what I claim as new and desire to protect by Letters Patent is:

1. Process of minimizing corrosion in an oil cracking still, which comprises: supplying to the stream undergoing heating, successive increments of an adsorbent consisting essentially of calcium hydroxide and adapted to react with corrosive compounds generated by decomposition of ingredients in the oil; and timing said increments so as to add each increment at substantially the time that the previous increment ceases to liberate structural water.

2. Process of minimizing corrosion in an oil cracking still, which comprises: supplying to the stream undergoing heating, successive increments of an adsorbent consisting essentially of a finely divided hydrous mineral adsorbent having the characteristic of liberating its structural water gradually when heated to oil-conversion temperatures; and timing said increments so as to add each increment at substantially the time that the previous increment ceases to liberate structural water.

3. Process of minimizing corrosion in an oil cracking still, which comprises: supplying to the stream undergoing heating, successive increments of an adsorbent consisting essentially of calcium hydroxide and adapted to react with corrosive compounds generated by decomposition of ingredients in the oil; timing said increments so as to add each increment at substantially the time that the previous increment ceases to liberate structural water; and pre-determining the timing for said increments by exposing a sample of said adsorbent to a time-temperature and pressure history substantially the same as in the still, under an atmosphere of hydrocarbon gas.

4. A process according to claim 1 in which a fraction of calcium hydroxide contaminated with a significant percentage of calcium carbonate, up to 8%, is included in the materials supplied.

5. In an oil cracking process in which the continuous progressive exposure of fresh reactive surfaces of adsorbent lime is advantageous, the novel procedure of making successive additions of calcium hydroxide, and timing the successive additions so that each addition is made substantially at the time that the previous addition ceases to evolve water.

6. In an oil cracking process in which the continuous progressive exposure of fresh reactive surfaces of an adsorbent is advantageous, the novel procedure of supplying the adsorbent in the form of particles which gradually and progressively evolve vapor, and by such evolution clean and expose fresh reactive surfaces during the period of vapor release; and timing the successive additions so that each addition is made substantially at the time that the previous addition ceases to release vapor.

ARTHUR D. SMITH.